June 2, 1936.  W. B. SCHULTE  2,042,806
BATTERY
Filed Dec. 15, 1934    2 Sheets-Sheet 1
Fig. 1.
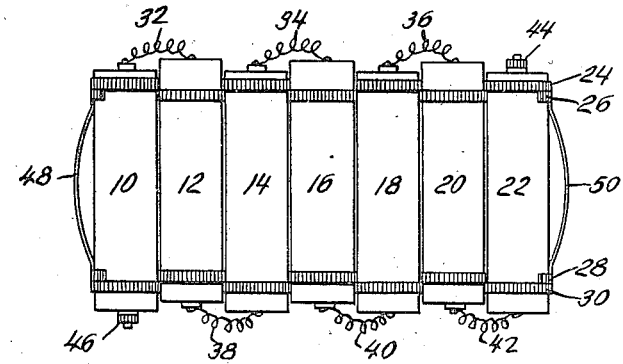
Fig. 3.
Fig. 2.
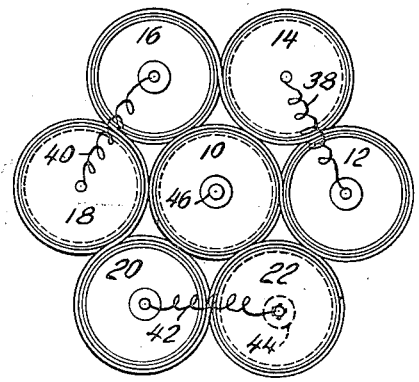
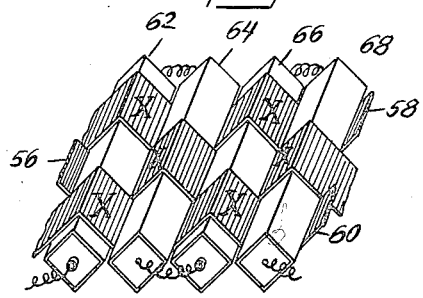
Fig. 5.
Fig. 4.
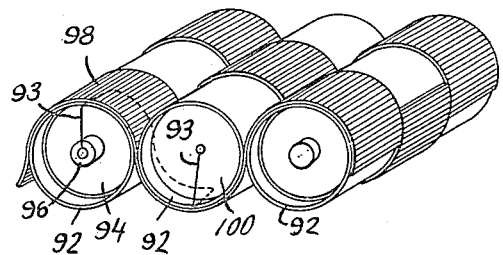
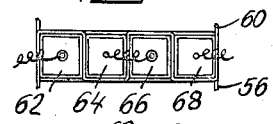
Fig. 6.
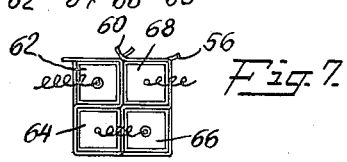
Fig. 7.
INVENTOR
Walter B. Schulte
BY
Pennie, Davis, Marvin & Edmonds
ATTORNEYS June 2, 1936.  W. B. SCHULTE  2,042,806
BATTERY
Filed Dec. 15, 1934   2 Sheets-Sheet 2
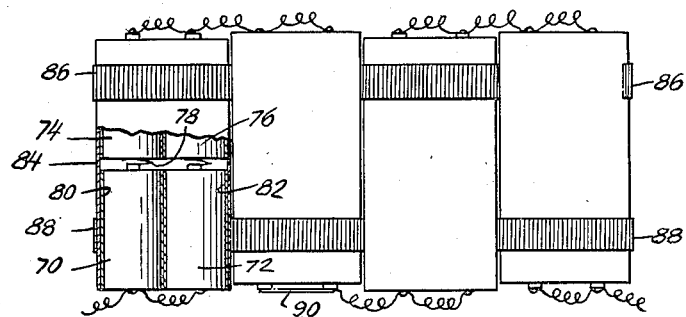
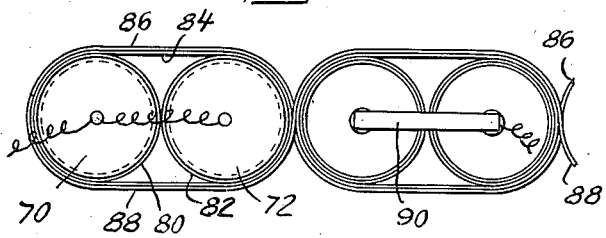
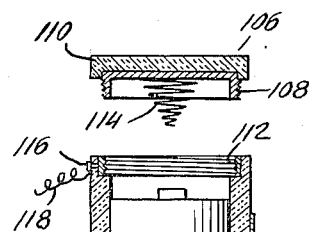
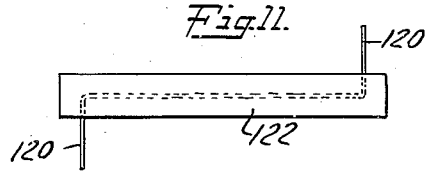
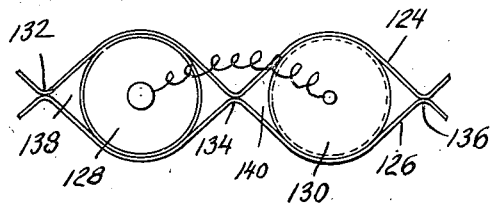
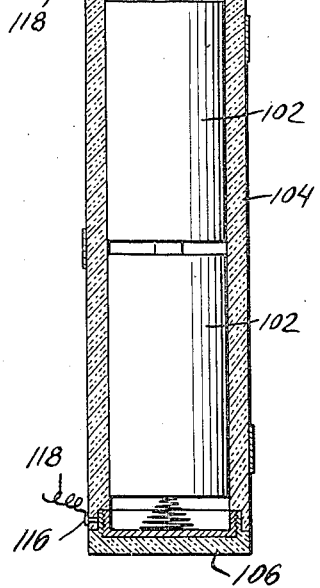
INVENTOR
Walter B. Schulte
BY
ATTORNEYS Patented June 2, 1936

2,042,806

UNITED STATES PATENT OFFICE 2,042,806

BATTERY

Walter B. Schulte, Madison, Wis., assignor to Burgess Battery Company, Freeport, Ill., a corporation of Wisconsin Application December 15, 1934, Serial No. 757,594

13 Claims. (Cl. 136—108)

This invention relates to an improvement in multi-cell batteries.

Among the objects of this invention are the following: Manufacture of a multi-cell battery which is mechanically flexible, which occupies a minimum of space, which is of minimum weight, which has numerous voltage taps, which may be rolled or folded to accommodate itself to odd-shaped shelves or compartments, and which may be carried readily on the person.

The invention and some modifications thereof are illustrated in the accompanying drawings in which:

Fig. 1 is a side elevation of a flexible battery of my invention;

Fig. 2 is an end view showing the battery of Fig. 1 rolled into a minimum space;

Fig. 3 is a detailed view showing the method of fastening the interwoven ribbon to the cell jackets;

Fig. 4 is a perspective view showing a method of electrically connecting adjacent cells;

Fig. 5 is a perspective view of a flexible battery of my invention formed of square cells;

Figs. 6 and 7 are end view showing the battery of Fig. 5 folded;

Figs. 8 and 9 are a side elevation and an end view of another form of my flexible battery; the jacket of one of the units being partially removed;

Fig. 10 is a sectional view of a unit construction in which the cells are replaceable;

Fig. 11 is a detailed view of an insulated jumper strip used as a connector in my improved battery; and Fig. 12 is an end elevation of another form of my invention.

The battery of my invention consists of a row of laterally adjacent electrically connected cells or cell units positioned parallel with respect to each other. These cells are connected into a flexible battery by means of one or more strips which girdle the cells. The strips preferably are interwoven with the cells in woof and warp relationship. This produces a battery of extreme flexibility since it may be folded or rolled. The invention relates specifically to batteries composed of dry cells and especially the ordinary cylindrical dry cell in which is cylindrical zinc cup is used for one electrode and a central carbon rod is used for the other. Any type of cell or battery may be used, however, which lends itself to the construction described herein.

My improved battery as illustrated in Fig. 1 consists of jacketed dry cells 10, 12, 14, 16, 18, 20 and 22. The jacket may be omitted under certain conditions as will be explained hereinafter. Although a single cell is shown, it is obvious that each jacket or "stick" or "unit' may contain one or more cells which usually are connected in series as shown and described in Schulte Patent 1,785,981, dated December 23, 1930, the cells being positively connected by an electrical conductor. The cells or cell units are assembled parallel to each other, the polarity of the units being reversed axially if the units are to be connected in series as shown, and not being reversed if the units are to be connected in parallel. The units are then woven together preferably with heavy cloth ribbons or tapes 24, 26, 28 and 30, at least three usually being used in order to prevent twisting of the battery. The ends of the ribbons are attached to the jackets as by gluing or other means, as by stapling. The units are then connected in series by electrical conductors 32, 34, 36, 38, 40 and 42, composed preferably of insulated wire. Terminal posts 44 and 46 are mounted on the terminal electrodes for convenience. It is obvious, however, that it is easy to clip into the circuit at the exposed electrode of each unit in order to obtain varying voltages. Handles 48 and 50 are attached to the end units for carrying or suspending the battery.

The completed battery is flexible and may be handled more or less like a ribbon. It may be hung on a wall, panel or other flat surface, or used as a belt on the person. It may be wound into a roll as shown in Fig. 2, or folded into a great variety of shapes whereby it may be made to fit into a variety of odd shaped spaces. The battery is of minimum weight since the cells are not sealed into boxes. The sealing material used in the ordinary battery, such as a "B" battery adds considerably to the weight. The relation of the flexible ribbon to the cells when the battery is rolled is shown in Fig. 2.

Fig. 1 shows four ribbons interwoven with the cells. This number may be increased or decreased according to the necessity for meeting specifications as to cost and quality. It is desirable to glue, staple or otherwise fasten the ribbon on other flexible strip means to the cells or jackets thereof, at points where common top and bottom tangents touch the surfaces of the cells or cell jackets, when they are arranged in a row, as shown at 52 and 54 in Fig. 3. This keeps the cells in place and prevents wearing and warping or twisting. When the strip is glued or otherwise fastened, it is evident that it is possible to use but one strip to make the battery of my invention.

Paper ribbon or tape may be substituted for cloth ribbon or tape. A plurality of strands of thread, string, wire, etc. may be used. The strip means may extend completely across the axial length of the units as shown in Fig. 4, or it may occupy but a small proportion of the area, as shown in Fig. 1. The flexible strip means forms a girdle for the cells and holds each cell in position, especially if it is fastened as described. Although the ribbon, tape, or string, if not made of conductive material, separates the laterally adjacent cells with an air space and thereby adds to the insulation and prevents short-circuiting, safety usually requires an insulating jacket on the cells when a series connection is used as in a high-potential battery. When the cells are connected in parallel, it is obvious that it is not necessary to insulate the like poles of adjacent cells from each other. Instead of jacketing the cells in order to provide insulation, these may be coated with a suitable enamel, varnish or the like.

Fig. 5 shows a flexible battery made of square cells or cylindrical cells inserted in square cartons. The ribbons 56, 58 and 60 are interwoven with the cell units and fastened to certain surfaces, indicated by "X", and also on surfaces opposite thereto, as will be explained. The ribbons 58 and 60 are fastened to the surface indicated of cell unit 62, and ribbon 56 is fastened to the opposite surface of cell unit 62. Ribbon 56 is fastened to the surface indicated of cell unit 64, whereas ribbons 58 and 60 are fastened to the opposite surface of cell unit 64. Cell units 66 and 68 and subsequent pairs of cell units are duplicates of units 62 and 64 with respect to this arrangement. A flexible battery thus composed of square cell units may be folded for example as shown in Figs. 6 and 7 into a large number of other shapes.

The individual cells in the units may be in lateral relation as shown in Figs. 8 and 9 rather than in end to end relation. Cells 70 and 74 are in end to end relation, being connected in series by wire 78 soldered to the brass cap of the central carbon of cell 70 and to the bottom of the zinc can of cell 74. Likewise, cells 72 and 76 are connected in series. The two pairs of cells are placed laterally adjacent and parallel to each other as shown. The end to end pairs may be jacketed by tubing 80 and 82, or by wrapping in paper, if desired. The end to end pairs are then connected in parallel as shown, and then jacketed in wrapper 84 to form a unit of four cells.

The desired number of jacketed units of four or more cells are interwoven with flexible strips 86 and 88 to produce the flexible battery of my invention. Three strips should be used if a more rigid construction is desired. The units are then electrically connected as desired. It is not necessary to use flexible conductors between laterally adjacent cells in the same unit since the cells do not move with respect to each other. A stiff conducting strip 90 may be used.

In Fig. 4 a method is shown for connecting the adjacent cells or units that move with respect to each other so that the connecting wires are practically invisible. The jackets 92 preferably extend beyond the ends of the cells or cell units as shown to completely shield the cell electrodes. With the units arranged in a straight row as shown in Fig. 4, the conductor 93 is attached to the brass central cap 96 of a cell 94 of one cell unit and passes through the jacket substantially at the common tangent to all the units but remains under the flexible strip 98. The conductor is carried under this strip until it reaches the point closest to the adjacent cell 100 where it passes through the flexible strip and continues between the flexible strip and jacket of cell 100 until it reaches the common tangent on the opposite side of cell 100. The conductor then passes through the jacket to the zinc of cell 100 to which it is attached as by soldering. The conductor mounted in this way does not interfere with the action of the flexible strip so that the battery may be rolled and folded in the usual way. The conductor may be regarded as a reinforcement for the flexible strip.

This construction may be improved by making the conductor unitary with the ribbon or tape 98, for example, by using the insulated jumper shown in Fig. 11. The wire or conductor strip 120 for connecting cells 94 and 100 is enclosed and insulated by the ribbon or tape 122 except for the terminal end portions as shown. The ribbon or tape ends are attached to the jackets at the common tangents at opposite sides of adjacent cells whereas the free ends of the conductor 120 pass through the cell jackets and are attached to the respective cell electrodes 96 and 100. It is apparent that the insulated jumper so mounted replaces a portion of the interwoven ribbon or tape 98.

In Fig. 10 a tubular casing for the cells is shown which allows the individual cells to be removed from the casing. This construction allows the flexible battery to be readily renewed by replacement of the cells, the balance of the battery construction not being discarded as is necessary where the cells are not replaceable. The casing has an end construction similar to that used in the end cap of the ordinary flashlight case. However, in Fig. 10 an insulated end cap and tube is shown so as to minimize the possibility of short-circuiting.

The dry cells 102 are inserted in end-to-end series relation in an insulated tube 104 as in the ordinary flashlight. This is closed by end caps 106 of similar construction. The end cap consists of an exteriorly threaded metal ferrule 108 which has an insulating cap 110. The ferrule threads into an interiorly threaded bushing 112 set into the end of the insulated tube 104. A coiled cone-shaped spring 114 or other suitable spring is mounted in ferrule 108 as shown to urge the cells forward and make good electrical contact. The cells are held firmly thereby and do not rattle. A metal contact 116 passes through the casing 104 and makes contact with bushing 112. An insulated jumper wire 118 is attached to this contact and connection is made to the adjacent battery unit as shown in Fig. 4, the units being tied together by interwoven ribbons as is also shown in that figure. The resulting ribbon battery consists of a completely insulated construction in which the individual cells may be replaced readily. The electrical circuit passes from the metal contact 116 successively through the bushing 112, ferrule 108, spring 114, cells 102 and out through the other cap in reverse order.

The cells may be used in the construction of Fig. 10 either with or without individual jackets. If a metal tubular casing is used in place of the non-conductive tube 104, the metal tube preferably being covered with insulation, it is apparent that the individual cells must be insulated from the casing preferably by jacketing the individual cells, such as the individual jacketed cells now being universally sold for service in flashlight cases.

In Fig. 12 the construction is such that each cell or cell unit may be completely insulated by the flexible material, thereby eliminating the necessity for jacketing the individual cells or cell units. The flexible ribbons or strips 124 and 126 and cells 128 and 130 are not interwoven as in the constructions previously described. The flexible ribbons or strips 124 and 126 preferably have a width equal at least to the length of the cells or cell units and are fastened together at spaced intervals 132, 134, 136 thereby forming pockets or openings 138 and 140 into which the cells or cell units are inserted. If the ribbons or strips are wider than the length of the cells or cell units, then the latter are completely insulated from each other. The cells or cell units may be glued or otherwise fastened to the ribbons or tapes as in the interwoven constructions. In this construction it is obvious that more space, as shown, is required between adjacent parallel cell units 128 and 130 but the battery may be rolled into a compact unit as shown in Fig. 2.

The constructions shown are merely illustrative of the invention which is not limited to the details of the figures. Various modifications will be obvious to those skilled in the art and may be made without departing from the scope of the invention as defined by the claims.

I claim:

1. An electric battery comprising a plurality of electrically connected cells and flexible means interwoven with the cells in such manner that the cells form the warp and the flexible means the woof, said interweaving being so arranged that the cells may be rolled or folded upon one another as herein described.

2. An electric battery comprising a plurality of electrically connected cylindrical dry cells and flexible means interwoven with the cells in such manner that the cells form the warp and the flexible means the woof, the axes of said cells being parallel to each other, said interweaving being so arranged that the cells may be rolled or folded upon one another as herein described.

3. An electric battery comprising a plurality of electrically connected cylindrical jacketed dry cells and flexible means interwoven with the cells in such manner that the cells form the warp and the flexible means the woof, the axes of said cells being parallel to each other, said cells comprising a zinc can of one polarity and a central electrode of opposite polarity exposed in the open end of said can, the laterally adjacent cells being reversed axially with respect to the top and bottom of the zinc cans, the interweaving of said cells and said flexible means being so arranged that the cells may be rolled or folded upon one another as herein described.

4. An electric battery comprising a plurality of electrically connected dry cell units and flexible means interwoven with the units in such manner that the units form the warp and the flexible means the woof, each of said units comprising two or more cells with an insulating jacket, said units being parallel axially to each other, said interweaving being so arranged that the units may be rolled or folded upon one another as herein described.

5. An electric battery comprising a plurality of electrically connected cells and flexible means interwoven with the cells in such manner that the cells form the warp and the flexible means the woof, said interweaving being so arranged that the cells may be rolled or folded upon one another as herein described, said flexible means being attached to at least some of said cells.

6. An electric battery comprising a plurality of electrically connected jacketed cylindrical dry cells and flexible ribbon or tape interwoven with the cells in such manner that the cells form the warp and the tape or ribbon the woof, said cells being parallel axially to each other, the interweaving being so arranged that the cells may be rolled or folded upon one another as herein described, said ribbon or tape being attached to the jackets of at least some of the cells.

7. An electric battery comprising a row of electrically connected jacketed units of dry cells and paper ribbon or tape interwoven with the cells in such manner that the units form the warp and the ribbon or tape the woof, said units being parallel axially to each other, said interweaving being so arranged that the units may be rolled or folded upon one another as herein described, said paper ribbon or tape being attached to said jackets at limited areas thereof.

8. An electric battery comprising a row of tube-like jacketed units of dry cells and flexible ribbon or tape interwoven with the units in such manner that the units form the warp and the ribbon or tape the woof, said units being parallel axially to each other, each unit having its opposite ends of opposite polarity, the adjacent ends of adjacent units being reversed with respect to their polarity, said interweaving being so arranged that the cells may be rolled or folded upon one another as herein described, and flexible electrical connections between said adjacent ends of said adjacent units.

9. An electric battery comprising a row of cylindrical jacketed units of dry cells and flexible ribbon or tape interwoven with the cells in such manner that the cells form the warp and the ribbon or tape the woof, said units being parallel axially to each other, each of said jacketed units consisting of a plurality of cylindrical dry cells in series end to end relation, electrical connectors between adjacent cells to form positive connections therebetween, each unit having its opposite ends of opposite polarity, the adjacent ends of adjacent units being reversed with respect to their polarity, said ribbon or tape being attached to said jackets at points thereof and said interweaving being so arranged that the units may be rolled or folded upon one another as herein described, and flexible electrical connections between the adjacent ends of adjacent units.

10. An electric battery comprising a row of laterally adjacent electrically connected cells positioned parallel with respect to each other and flexible means so girdling and positioning said cells that said cells may be rolled or folded in either direction with respect to one another from a position in which the longitudinal axes of the cells lie in the same plane while being maintained in parallel relationship.

11. An electric battery comprising a row of laterally adjacent electrically connected cell units positioned parallel with respect to each other, each of said units comprising two or more cells within an insulating jacket, and flexible means so girdling and positioning said units that said units may be rolled or folded in either direction with respect to one another from a position in which the longitudinal axes of the cells lie in the same plane while being maintained in parallel relationship.

12. An electric battery comprising a plurality of laterally adjacent jacketed cells and flexible means interwoven with the cells in such manner that the cells form the warp and the flexible means the woof, flexible conductors electrically connecting cells in lateral relationship, each of said conductors being attached to the electrodes of a pair of said cells in lateral relationship, each of said conductors emerging exteriorly of and at the opposite sides of the jackets of the cells to which it is attached at substantially the common tangent of adjacent cells, said conductor lying upon the exterior surface of each of said jackets from the point of emergence to the point where both jackets are closest to each other, substantially as described.

13. The structure of claim 12 in which the portion of the conductor lying upon the exterior surfaces of said jackets is insulated.

WALTER B. SCHULTE.